Patented Mar. 28, 1950

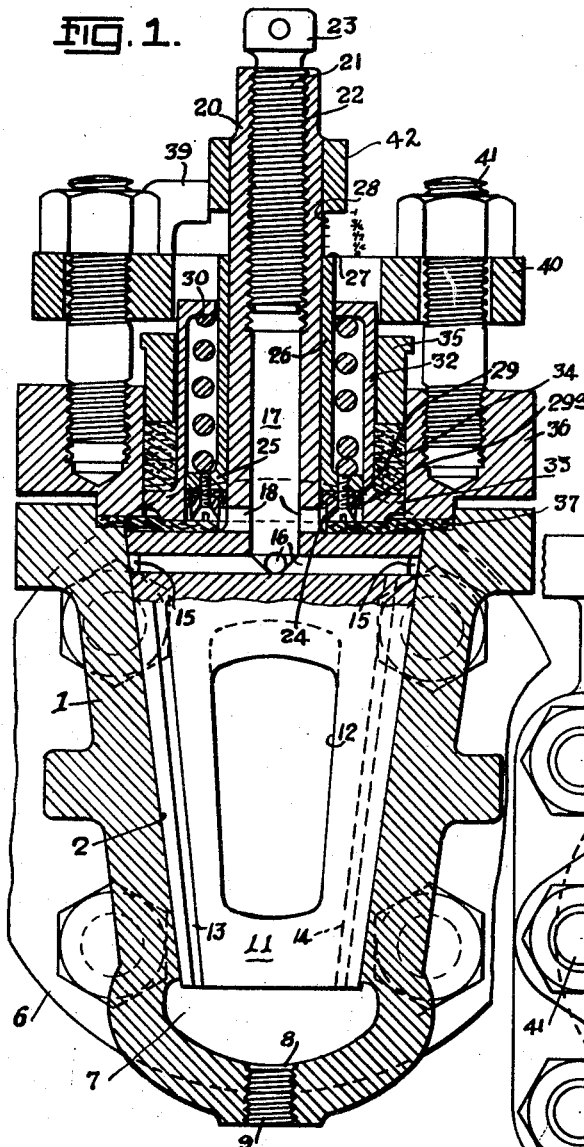

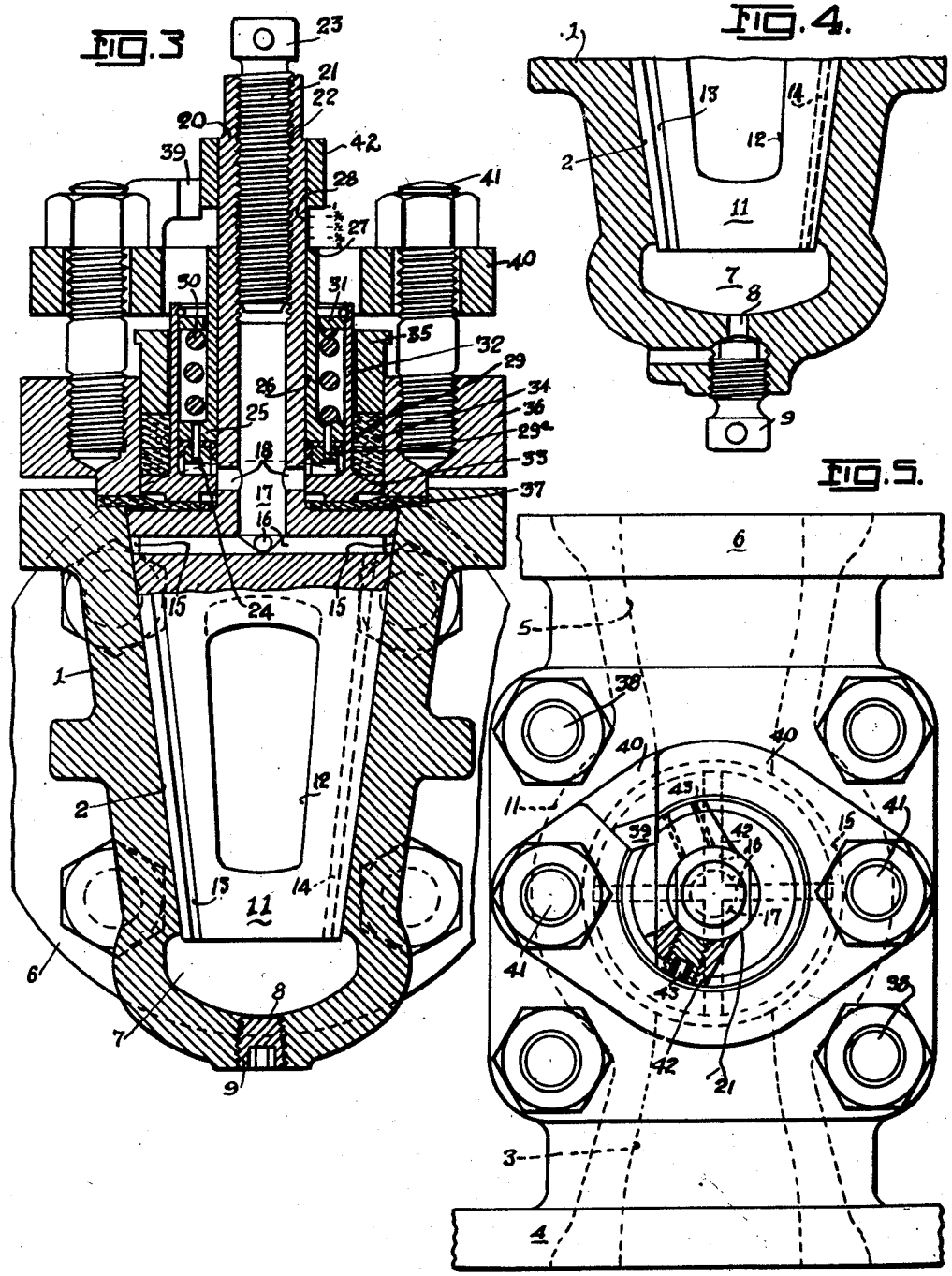

2,501,946

UNITED STATES PATENT OFFICE 2,501,946

PLUG COCK VALVE

Oystein Jacobsen, Dayton, Ohio, assignor to The Duriron Company, Inc., Dayton, Ohio, a corporation of New York Application January 5, 1945, Serial No. 571,393

7 Claims. (Cl. 251—93)

My invention relates to plug cock valves and in particular to lubricated valves of this type.

The object of this invention is to provide an automatically operating storage means for storing and discharging lubricant into the passageways of a plug valve to maintain it in constantly lubricated condition.

It is a further object to provide a spring loaded piston for operating upon lubricant within a chamber and for the progressive discharge of the lubricant through the passageways of a plug valve.

It is a further object to provide means of indicating the supply of lubricant in the pressure chamber so that the lubricant can be replenished when needed. In this manner, it is easy to observe the exact condition of the supply of lubricant and to replenish it as desired without wasting the grease or oil and without over lubricating the valve.

In particular the object of this invention is to provide for the loading of a plug cock valve with lubricant from the stem into a lubricant pressure chamber from which it can be redischarged progressively as needed into the passageways between the valve body and the valve plug.

It is a further object to provide a yieldingly operated piston rod and piston, the end of the piston rod or piston sleeve acting as an indicator as to the amount of lubricant still remaining in the lubricant chamber. In this way it facilitates the ascertainment of whether or not the lubricant chamber needs additional lubricant in order to maintain the progressive lubrication of the valve.

It is another object to provide a lubricated plug valve having a flushing out passage so that the valve casing and plug may be cleaned without dismantling the valve or taking it out of service.

Referring to the drawings:

Figure 1 is a vertical section through one embodiment of the invention showing the condition of the parts prior to the injection of lubricant through the stem and the loading of the spring loaded lubricant chamber.

Figure 2 is a top plan view of Figure 1.

Figure 3 is a view similar to that of Figure 1 showing a modification of the construction of the lubricant chamber and the spring actuated pressure piston.

Figure 4 is a detailed section showing the arrangement of a modified form of clean out plug and clean out opening at the bottom of the valve in the valve casing.

Figure 5 is a top plan view of Figure 3 partially broken away to indicate the construction of the stop mechanism on the stem.

Referring to the drawings in detail, 1 designates a conical valve body having an inwardly and downwardly disposed wall 2. This body is provided with a passageway 3 having a flange 4 and an oppositely disposed passageway 5 having a flange 6.

At the lower end of the valve casing 1 is an enlarged chamber 7 for receiving discharged lubricant. Access to this chamber is gained through the clean out passageway 8 which is closed by the screw plug 9.

The upper end of the valve casing 1 is open for receiving the valve plug 11 which consists of a tapered body fitting the walls 2 on the interior of the valve casing 1. This body is provided with a transverse passageway 12 to permit the passage of fluids or gases when aligned with the passageways 3 and 5.

The valve plug is also provided with lubricant passageways 13 and 14 that extend vertically on its surface in order to provide passageways for oil or grease to lubricate the surface of the valve where it engages the wall 2 of the valve casing 1. The top and bottom of these grooves 13 and 14 are open so that the lubricant may pass from the top from the annular groove or passageway 15 through the said grooves and be discharged into the space 7 and then through the passageway 8.

The groove 15 in the plug is intersected by a plurality of transverse passageways 16, preferably arranged at right angles to one another in the body of the plug 11. Lubricant is delivered to the groove 15 through the bores 16 from the vertical bore 17 in the stem 20 of the plug 11.

Associated with the vertical passageway 17 is the transverse passageway 18, also in the stem 20. The upper end of the bore 17 is threaded as at 22 to receive the screw 21 which has the head 23. The bore 17 is the receptacle into which lubricant is delivered, usually in stick form, and from which it is discharged by the pressure of the screw 21.

The lubricant is forced out of the passageway 17 through passageways 18 into the chamber 24 beneath the piston 25. This piston 25 is guided by the piston sleeve 26, the upper end of which at 27 acts as an indicator on the scale 28 to indicate the amount of lubrication still remaining within the chamber 24 beneath the piston 25. The piston carries on its lower surface the washer 29 which is held in position by the retaining studs or screws 29a.

Mounted upon the top of the piston 25 is a spring 30, the upper end of which rests against an abutment. Alternative forms of providing such abutment are shown in Figures 1 and 3. The spring 30 resists the upward movement of the piston 25 caused by the introduction of lubricant into the cylinder 32 which houses the said piston. The cylinder 32 has at the bottom a base portion 33 which extends outwardly from the said cylinder to provide a flange for supporting the packing 34 which is retained in position by the gland 35 mounted within a bored plate 36. Both the cylinder 32 through its base 33 and the plate 36 bear upon the sealing ring 37. The plate 36 is secured to the body 1 by the bolts 38 and in this way seals against the lubricant escaping from between the plate 36 and the body 1. At the same time, the cylinder 32 is pressed downwardly against the ring 37 and prevents leakage from around the stem or the member 11 and the valve is thus completely sealed against leakage. The cylinder 32 is pressed down by the packing 34 which in turn is pressed down by the gland 35. The gland 35 is held down by the plate 40 which is secured to the plate 36 by the bolts 41.

In operation, the rotation of the valve plug is limited by the stop lug 39 which is mounted upon the plate 40 that is retained in position by the screw bolts 41. The stop 39 engages with the stop 42 mounted upon the valve stem 21. The stop 42 is provided with oppositely disposed wings which receive set screws 43. As the valve plug rotates from open to closed and from closed to open position the stop 39 is engaged by the stop member 42.

In operation, the screw 21 is removed and lubricant is introduced either by gun or in the form of stick lubricant into the passageway 17 whence it is discharged through the bores 16 and into the grooves 15, 13 and 14. It is also stored beneath the piston 25 by being discharged through the passageway 18 into the chamber 24. When it is so discharged it lifts the piston 25 against the resistance of the spring 30 until the top of the piston sleeve 27 engages the bottom of the stop 42 at which point the indication of the scale 28 by the top of the sleeve 27 indicates full. As the valve is operated and the plug is rotated, the lubricant is gradually used up so that the top 27 of the sleeve 26 descends along the scale 28 indicating the degree of the consumption of lubricant. In this way it is possible to observe that the plug needs lubricating without opening the line and the plug can be relubricated from time to time. Thus, by the arrangement of this invention, it is possible to provide an automatic supply of lubricant for a valve and also to replenish the supply thereof without dismantling the valve or otherwise interfering with the normal functioning thereof.

It will be understood that I desire to include in the scope of my invention or hereinafter appended claims such mechanical modifications as may be necessary to adapt this invention to various conditions of use.

I claim:

1. In combination in a plug cock valve, a valve body, a rotatable plug mounted therein having a stem and a plurality of passageways through the stem and on the surface of said plug, a plate mounted on said valve body and adapted to retain in position said plug therein and to surround the stem of said plug, a removable chamber member mounted within said plate in communication with the passageways within said stem and plug and surrounding said stem, a piston in said chamber member and also surrounding said stem, yielding means for urging said piston toward the bottom of said chamber member whereby the introduction of lubricant into said chamber member through said stem will be progressively discharged thereafter through the grooves in said plugs and packing between said chamber member and plate.

2. In combination in a plug cock valve, a valve body, a rotatable plug mounted therein having a stem and a plurality of passageways through the stem and on the surface of said plug, a plate mounted on said valve body and adapted to retain in position said plug therein and to surround the stem of said plug, a removable chamber member mounted within said plate in communication with the passageways within said stem and plug and surrounding said stem, a piston in said chamber member also surrounding said stem, yielding means for urging said piston toward the bottom of said chamber member whereby the introduction of lubricant into said chamber member through said stem will be progressively discharged thereafter through the grooves in said plugs, means associated with said piston for indicating outside of said chamber member the degree of discharge of the lubricant from the chamber, and packing in the space between said chamber member and plate, the lubricant in said chamber member and packing sealing said body against leakage.

3. In combination in a plug cock valve, a valve body, a plug and stem, said stem being hollow and having a plurality of passageways communicating therewith to permit the discharge of lubricant from said hollow stem and a plurality of grooves on said plug in communication with said passageways, a bored plate mounted on said valve body and enclosing a portion of said plug and surrounding said stem, a sealing member between said plug and said plate, a removable cylinder member mounted within the bore in said plate and mounted on said sealing member about said valve stem, packing means surrounding said cylinder member for retaining it within said bore and for sealing against leakage, a movable piston and piston sleeve mounted within said cylinder member, said sleeve being slidably mounted on said valve stem, yielding means for moving said piston and piston sleeve in one direction while the lubricant introduced into said cylinder will move the piston and the piston sleeve in the other direction, and means for detachably sealing said valve stem to permit the introduction of lubricant into the interior thereof.

4. In combination in a plug cock valve, a valve body, a plug and stem, said stem being hollow and having a plurality of passageways communicating therewith to permit the discharge of lubricant from said hollow stem and a plurality of grooves on said plug in communication with said passageways, a bored plate mounted on said valve body and enclosing a portion of said plug and surrounding said stem, a sealing member between said plug and said plate, a removable cylinder member mounted within the bore in said plate and mounted on said sealing member about said valve stem, means for retaining said cylinder member within said bore and for sealing around said cylinder member, a movable piston and piston sleeve mounted within said cylinder, said sleeve extending out of said cylinder and slidably mounted on said valve stem, and yielding means for moving said piston and piston sleeve in one direction while the lubricant introduced into said cylinder will move the piston and the piston sleeve in the other direction, means for detachably sealing said valve stem to permit the introduction of lubricant into the interior thereof, and means for limiting the rotation of the valve stem mounted upon said plate, said last mentioned means also serving as a stop for said piston sleeve.

5. A valve for controlling the flow of fluid through a coupling, said coupling being provided with a main passageway and an angularly positioned bore communicating therewith, a plug within said bore adapted to rotate and having lubricating surfaces, means for lubricating said surfaces, said means including a hollow stem integral with said plug for receiving a supply of lubricant, a sleeve reciprocably slidable over said stem and provided with an outwardly extending flange at the end nearer the plug, a cylinder surrounding said flange at one end and closed at the other end by a circular abutment, a spring mounted between said flange and abutment to force the sleeve toward said plug, the side of the flange opposite from said spring being in communication with the interior of said stem and also with the lubricating surfaces of the plug whereby when lubricant is supplied to the interior of the stem such lubricant is forced into the cylinder against said flange and the spring in forcing the flange toward the plug causes the lubricant to travel along the lubricating surfaces of the plug, an outwardly projecting flange on the plug end of said cylinder, and packing compressed against the said flange for sealing around said cylinder.

6. A valve for controlling the flow of fluid through a coupling, said coupling being provided with a main passageway and a tapered angularly positioned bore communicating therewith and closed at its small end, a tapered plug within said bore adapted to rotate and having lubricating grooves, said grooves opening into the closed end of said bore means for lubricating said grooves, said means including a hollow stem integral with said plug and extending from the larger end of said bore for receiving a supply of lubricant, a sleeve reciprocably slidable over said stem and provided with an outwardly extending flange at the end nearer the plug, a cylinder surrounding said flange at one end and closed at the other end by a circular abutment, a spring mounted between said flange and abutment to force the sleeve toward said plug, the side of the flange opposite from said spring being in communication with the interior of said stem and also with the lubricating grooves of the plug whereby when lubricant is supplied to the interior of the stem such lubricant is forced into the cylinder against said flange and the spring in forcing the flange toward the plug causes the lubricant to travel along the lubricating surfaces of the plug, indications on said stem opposite that end of the sleeve which is remote from said flange showing at a glance the amount of lubricant which has been forced from the interior of the stem into the interior of said cylinder and available for use in lubricating the surfaces of the plug, a screw threaded into the open end of said stem to force lubricant therefrom, and a stop member on said stem to abut said sleeve in a predetermined position.

7. A valve for controlling the flow of fluid through a coupling, said coupling being provided with a main passageway and a tapered angularly positioned bore communicating therewith and closed at its small end, a plug within said bore adapted to rotate and having lubricated surfaces, a hollow stem secured to said plug and extending out the larger end of said bore, a sleeve reciprocably slidable over the stem and having an outwardly directed flange at the end of the sleeve nearer the plug, a cylinder surrounding said sleeve and secured to said valve, said cylinder having an inwardly extending flange which together with the flange of said sleeve provides a substantially enclosed chamber, and a spring within said chamber adapted to urge against the inner surface of the sleeve flange to move said sleeve toward said plug, the interior of said cylinder at the side of the sleeve flange opposite from said spring being in communication with each of the interior of said stem and the lubricated surfaces of the plug whereby when lubricant is supplied to the interior of said stem the lubricant is forced against the outer surface of said sleeve flange within said cylinder and the spring provides a continuous pressure on the lubricant to force sufficient lubricant to cause said lubricant to travel over the lubricated surfaces of the plug, a screw threaded into the outer end of said stem to force lubricant therefrom, a stop member on said stem to abut and positively bolt said piston in a predetermined position, packing means surrounding said cylinder to seal said valve against leakage, and grooves in said plug connecting the closed end of said bore with said cylinder.

OYSTEIN JACOBSEN.

REFERENCES CITED

The following references are of record in the file of this patent:

UNITED STATES PATENTS

| Number | Name | Date |
|---|---|---|
| 1,851,259 | Martin | Mar. 29, 1932 |
| 1,940,378 | Sutliff | Dec. 19, 1933 |
| 2,281,697 | Kerr | May 5, 1942 |

FOREIGN PATENTS

| Number | Country | Date |
|---|---|---|
| 256,098 | Great Britain | of 1926 |
| 499,703 | Great Britain | of 1938 |